E. R. EVANS.
AIR CLEANER.
APPLICATION FILED DEC. 30, 1918.
1,430,066.
Patented Sept. 26, 1922.
2 SHEETS—SHEET 1.
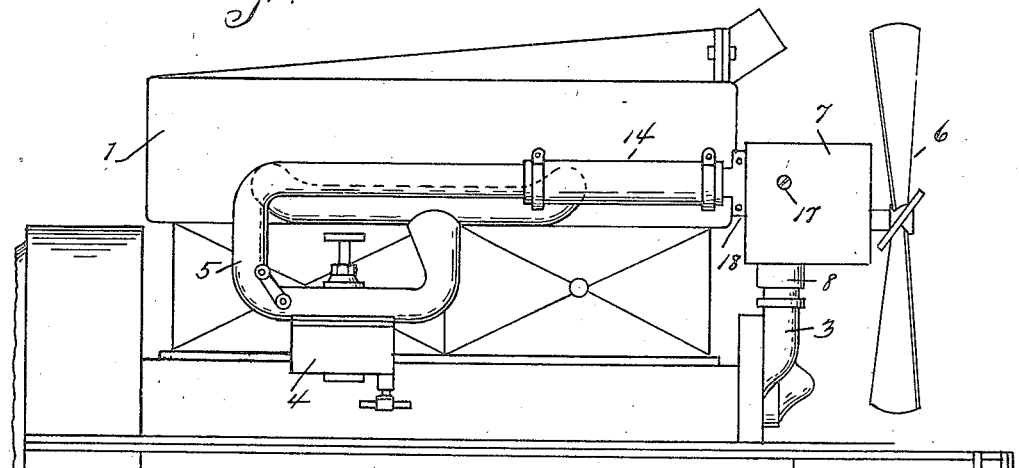
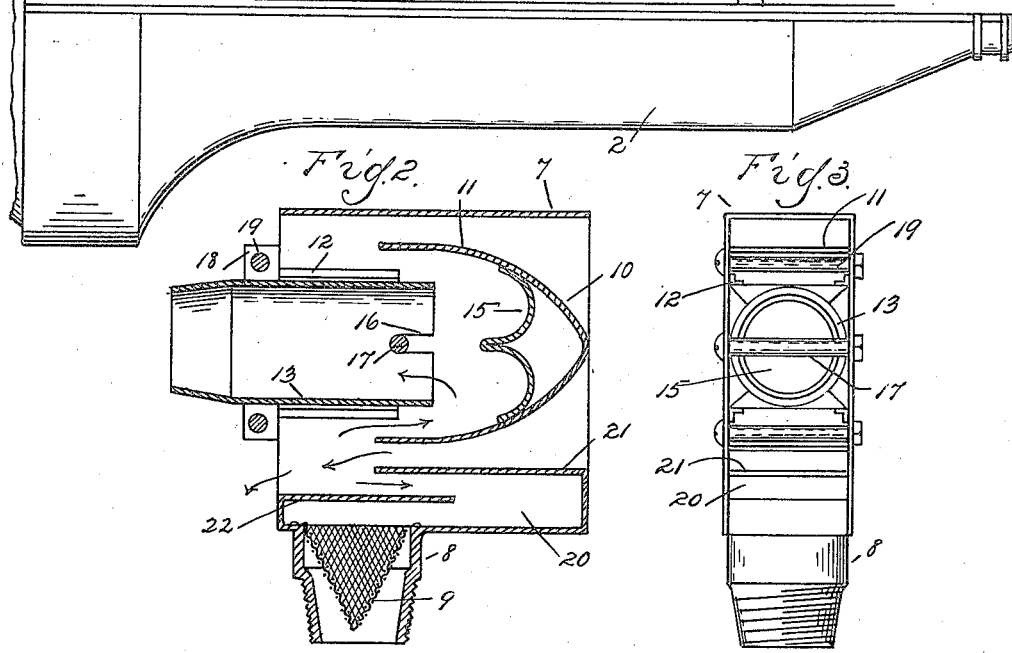
Inventor
Edwin R. Evans
By Whittemore Hulbert & Whittemore
Attorneys

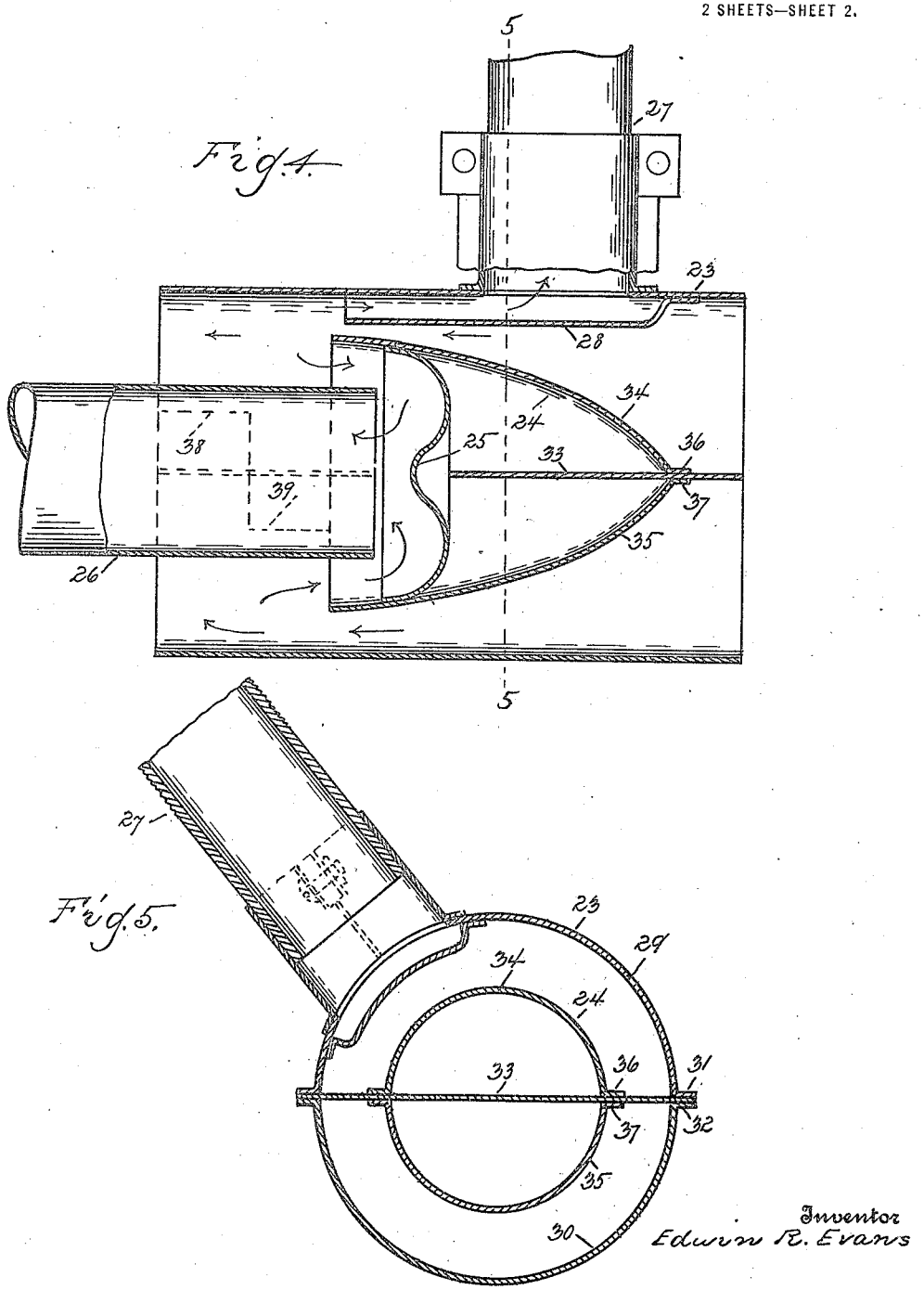

Patented Sept. 26, 1922.

1,430,066

UNITED STATES PATENT OFFICE.

EDWIN R. EVANS, OF DETROIT, MICHIGAN, ASSIGNOR OF ONE-HALF TO BYRON F. EVERITT, OF DETROIT, MICHIGAN.

AIR CLEANER.

Application filed December 30, 1918. Serial No. 268,911.

*To all whom it may concern:*

Be it known that I, EDWIN R. EVANS, a citizen of the United States of America, residing at Detroit, in the county of Wayne and State of Michigan, have invented certain new and useful Improvements in Air Cleaners, of which the following is a specification, reference being had therein to the accompanying drawings.

The invention relates to air cleaners and is adapted to be used particularly in conjunction with internal combustion engines for supplying air to the carburetor or breather thereof. The main object of the invention is to provide a novel construction of air intake device which will supply air with the dust, dirt and foreign matter removed. Another object of the invention is to provide a construction wherein the air to be utilized is withdrawn from a main supply of air set in motion by the fan which usually forms part of the air cooling system of an air internal combustion engine. The air supplied by the fan carries with it dirt and foreign matter and by producing a partial vacuum as, for example, through the medium of the carburetor or breather, clean air may be withdrawn from the main supply of air without necessarily withdrawing any of the foreign matter held in suspension thereby. A further object of the invention is to provide a simple, durable construction of air intake device which is so arranged that the dust, dirt and foreign matter in the main supply of air will continue in its path and the clean air will have a tendency to enter the connections to the carburetor and breather. Other objects of the invention reside in the novel arrangements and combinations of parts as more fully hereinafter set forth.

In the drawings:

Figure 1 is a side elevation of a construction embodying my invention;

Figure 2 is an enlarged longitudinal sectional view of the air cleaner;

Figure 3 is a rear elevation of the same;

Figure 4 is an enlarged longitudinal sectional view of a modified construction of air cleaner;

Figure 5 is a cross section on the line 5—5 of Figure 4.

As showing a particular use to which my invention is applied, 1 is a conventional form of combustion engine having a crank case 2 provided with a breather pipe 3, and adjacent the engine is an ordinary carburetor 4 having an air intake pipe 5. Associated with the engine is a fan 6 adapted to be driven thereby and cooperate with a radiator (not shown) in maintaining a cooling system for the engine.

As shown in Figures 1, 2 and 3, the air cleaner comprises a casing 7 with a depending connection 8 that is suitably connected to the breather pipe 3, as by threadedly engaging the same, this connection being provided with a screen 9.

The casing 7 is positioned behind the fan 6 so that the fan will drive air through the casing. 10 is a deflector which is somewhat nose-shaped and has the diverging sides 11, this deflector being positioned in the forward end of the casing 7 and adapted to divide the current of air passing therethrough and cause this air to be deflected toward the top and bottom walls of the casing. The deflector 10 is of less length than the casing 7 and due to its shape, it with the casing forms in effect a Venturi passageway for the air.

The side walls of the casing 7 are provided with inner parallel guides 12 which are slidably engaged by a connection 13, the outer end of which is connected by a flexible connection 14, such as a hose, to the air intake pipe 5 of the carburetor 4. The inner end of the connection 13 extends into the space between the diverging walls 11 of the deflector 10 and into proximity to the deflector 15 secured within the deflector 10. The inner end of the connection 13 has its opposite walls slotted, as at 16, to receive the transverse bolt 17 carried by the casing 7, and by tightening this bolt the walls of the casing 7 can be pressed against the walls of the connection 13 to hold the connection in its adjusted position. For further holding the connection 13 in its adjusted position the rear end of the casing 7 is provided with apertured lugs 18 connected by bolts 19 which may be tightened to clamp the connection in place, all of the bolts being preferably of the stove type.

By adjusting the connection 13, the inner end thereof may be moved to and from the concave convexo walls 11 of the outer deflector 10 and thus provide passages between the inner end of the connection 13 and the outer deflector 10 that may be restricted to form throats through which air may be drawn to impinge against the inner deflector 15 and be directed into the connection 13.

For the purpose of providing clean air for the breather pipe 3 the lower part of the casing 7 is provided with the back and forth passage 20 which is formed by horizontally disposed partitions 21 and 22, the latter extending over the connection 8 to prevent the current of air from directly entering said connection.

In the modified construction of air cleaner, as shown in Figures 4 and 5, the general arrangement of parts is substantially the same as that shown in Figures 1, 2 and 3 with the exception that the arrangement and construction of the parts in the modified construction is such that the latter may be more readily and cheaply manufactured. In detail, the air cleaner comprises the cylindrical casing 23, the convex hollow outer deflector 24 in the forward end of the casing, the inner deflector 25 within the outer deflector 24, the connection 26 adapted to be connected to the air intake pipe of the carburetor, the connection 27 opening into the space within the casing 23 and adapted to be connected to the breather pipe, and the horizontal partition 28 extending over the inner end of the connection 27. The casing 23 is formed of the complementary sections 29 and 30 which have the flanged edges 31 and 32 adapted to be suitably secured to the longitudinally extending transverse partition 33. The outer deflector 24 is formed of the complementary sections 34 and 35, which also have the flanges 36 and 37 at their side edges adapted to be suitably secured to the partition 33 which thereby positions the outer deflector concentrically within the casing. The connection 26 is secured in place by means of the flanges 38 and 39 formed upon the partition 33 and secured to the connection.

In operation, the fan 6 maintains a current of air through the casing of the air cleaner and due to the fact that the outer deflector with the casing form, in effect a Venturi passage-way for the air, the air will be compressed between the casing and the rear walls of the outer deflector and will then expand to the rear of the outer deflector. This expansion of the air will tend to force some of the air back against the inner deflector within the outer deflector, which will then be directed into the connection leading to the carburetor. The portion of the air entering this connection will be clean, due to the fact that the momentum of the dust, dirt and foreign matter in the air passing through between the casing and the outer deflector will carry this dust, dirt and foreign matter through the casing so that there will be no tendency for the same to reverse its direction of travel. This operation is also true of the air entering the connection leading to the breather.

From the above description it will be readily seen that the induced current of air prevents any dust, dirt or foreign matter held in suspension in the air from entering any of the indirect passages or entrances to the connections leading to the carburetor or breather, and while in the drawing there is illustrated a preferred embodiment of the invention, it is to be understood that the structural elements embodied may be varied and modified to an extent such as will fall within the scope of the following claims. It will also be readily seen that my invention may be used for purifying different fluids, such as gases, etc., and may be used in other apparatus than internal combustion engines.

What I claim as my invention is:

1. In an air cleaner, the combination with a cylindrical casing having open ends and an unobstructed passageway therethrough adapted for the passage of a current of air therethrough, of a longitudinally extending partition in said casing, a convex hollow deflector in said casing and mounted upon said partition, and an air intake conduit extending into said deflector and mounted on said partition.

2. In an air cleaner, the combination with a cylindrical casing having open ends and an unobstructed passageway therethrough adapted for the passage of a current of air therethrough, of a longitudinally extending partition in said casing, a convex hollow deflector in said casing and comprising complementary halves secured to said partition, a concave deflector in said convex hollow deflector, and an air intake conduit extending into said casing adjacent to said concave deflector and mounted upon said partition.

3. An air intake device of the type described comprising a casing having an unobstructed passageway therethrough adapted to have a current of air pass therethrough, and carburetor and breather connections in communication with said passage-way by indirect passages preventing foreign matter held in suspension by the current of air from entering said connections.

4. An air intake device of the type described comprising a casing through which air may be passed, a carburetor connection extending into said casing, a deflector in said casing adapted to prevent air from directly entering said carburetor connection, a breather connection in communication with said casing, and means other than said deflector in said casing adapted to prevent air from directly entering said breather connection.

5. An air intake device of the type described comprising a casing adapted to have a current of air pass therethrough, a carburetor connection in one end of said casing and communicating therewith, means in the opposite end of said casing adapted to deflect air past the inner end of said carburetor connection and cooperate therewith in providing a restricted passage, a breather connection communicating with said casing, and partition in said casing providing an indirect passage to said breather connection.

6. An air intake device of the type described, comprising a casing having an unobstructed passageway near its top and bottom, a deflector in the forward end thereof adapted to direct air towards the top and bottom of said casing, an inner deflector in the first-mentioned deflector, a carburetor connection extending into the first-mentioned deflector in proximity to said inner deflector, and a breather connection having an indirect passage in communication with said casing.

7. An air intake device for the carburetor and breather of an internal combustion engine, comprising a casing through which a current of air may be passed, a carburetor connection in the rear end of said casing, an outer deflector in the forward end of said casing and cooperating with the inner end of the carburetor connection in providing a restricted passage, an inner deflector in said outer deflector, a breather connection communicating with said casing, and a partition in said casing providing an indirect passage to said breather connection.

8. In a fluid purifier, the combination with a casing provided with an unobstructed passage-way adapted for the passage of fluid therethrough, a suction conduit communicating with said passage-way and adapted for the passage of a portion of the fluid passing through said casing, and means in said passage-way for preventing the fluid directly entering into said conduit.

9. In a fluid purifier, the combination with an unobstructed Venturi passage-way, of means for causing a flow of fluid through said passage-way, and means out of the travel of the fluid for withdrawing a portion thereof after it has expanded.

10. In a fluid purifier, the combination with a casing having open ends, of a deflector within said casing and forming therewith an unobstructed Venturi passage-way, means for causing a flow of fluid through said Venturi passage-way, and means connected with said passage-way beyond its contracted portion for withdrawing a portion of the fluid therefrom.

11. In an air purifier, the combination with a casing having open ends, of a curved deflector within said casing and forming therewith an unobstructed Venturi passage-way, means for causing a current of air to pass through said Venturi passage-way, and means extending within said curved deflector for withdrawing a portion of the air after it has expanded.

12. In a fluid purifier, the combination with a convex deflector, of means for causing a flow of fluid past said deflector, a suction conduit extending into said deflector and having a portion of its inner end spaced from the wall thereof for the passage of a portion of the fluid past said deflector, and a second deflector within said first mentioned deflector for directing the fluid entering between said conduit and first mentioned deflector into said conduit.

13. In an air cleaner, the combination with a casing, of a suction air conduit in communication with said casing, and a deflector in said casing and overlapping the end of said air conduit, said casing with said deflector forming an unobstructed passage-way adapted for the passage of a propelled current of air.

14. The combination with a suction conduit adapted for the passage of fluid, of a deflector for guarding the mouth of said conduit, means for inducing a current of the fluid against said deflector and in a direction substantially parallel to the longitudinal axis of said conduit and a wall between said deflector and conduit for directing the fluid entering said conduit thereinto.

15. In a structure for purifying air passing to a carburetor, the combination with a suction conduit connected to the carburetor, of a deflector for guarding the mouth of said conduit, and a fan for forcing air past said deflector, some of the air passing said deflector being drawn into said conduit.

16. In an air purifier for a carburetor, the combination with a passage-way having an intermediate portion of smaller cross sectional area than the end portions of a fan for causing a flow of air through said passageway, and a suction conduit connected to the carburetor and leading to said passageway out of the travel of the air for withdrawing a portion thereof after having passed said intermediate portion of the passage-way.

17. In combination, a carburetor suction conduit, an imperforate deflector surrounding and closely related to the mouth of said conduit, and a fan for forcing air past said deflector, said deflector being flared in the direction of the air current from the fan.

18. In combination, a carburetor suction conduit, an imperforate deflector surrounding and closely related to the mouth of said conduit, and a fan for forcing air past said deflector, said deflector being closed in the direction of the fan and forming a narrow opening between the conduit and the deflector directed away from the fan.

19. In combination, a carburetor suction conduit, an imperforate deflector having its edges in concentric relation to those of said conduit, said deflector being closely related to the mouth of said conduit, and a fan for forcing air past said deflector, said deflector being flared in the direction of the air current from the fan.

20. In an air purifier, the combination with a casing having open ends, of a deflector within said casing and forming therewith a Venturi passage-way, means for causing a flow of air through said Venturi passage-way, and a pipe having its end located adjacent to and protected by the deflector for withdrawing a portion of the air therefrom.

21. In an air purifier, the combination with a suction conduit for withdrawing air, of a deflector located adjacent to and in advance of the mouth of said conduit to protect the same, and a fan of an internal combustion engine for forcing air past said deflector, said suction conduit withdrawing some of the air passing said deflector.

22. In combination, a suction conduit connected to a carburetor of an internal combustion engine, an imperforate deflector closely related to the mouth of said conduit, and a fan of an internal combustion engine for forcing air past said deflector and engine in a direction opposite to that taken by the air being drawn into the mouth of said conduit.

In testimony whereof I affix my signature.

EDWIN R. EVANS.